(12) United States Patent
Meyer et al.

(10) Patent No.: US 7,612,156 B2
(45) Date of Patent: Nov. 3, 2009

(54) POLYMERS OF BROMOSTYRENES HAVING CONTROLLED MOLECULAR WEIGHT

(75) Inventors: Wayne Meyer, West Lafayette, IN (US); Jennifer L. Bohan, Lafayette, IN (US); Larry D. Timberlake, West Lafayette, IN (US); James D. Siebecker, West Lafayette, IN (US)

(73) Assignee: Chemtura Corporation, Middlebury, CT (US)

( * ) Notice: Subject to any disclaimer, the term of this patent is extended or adjusted under 35 U.S.C. 154(b) by 578 days.

(21) Appl. No.: 11/241,535

(22) Filed: Sep. 30, 2005

(65) Prior Publication Data

US 2006/0079644 A1 Apr. 13, 2006

Related U.S. Application Data

(60) Provisional application No. 60/615,132, filed on Sep. 30, 2004.

(51) Int. Cl.
*C08F 12/16* (2006.01)
*C08F 2/38* (2006.01)

(52) U.S. Cl. .................. 526/293; 526/271; 526/273; 526/287; 525/333.4

(58) Field of Classification Search .................. 526/293, 526/271, 273, 287; 525/333.4
See application file for complete search history.

(56) References Cited

U.S. PATENT DOCUMENTS 4,755,573 A * 7/1988 Aycock ........................ 526/90
5,115,010 A 5/1992 Sakai et al.
5,304,618 A 4/1994 Atwell et al.
5,559,200 A 9/1996 Suzuki et al.
5,677,390 A 10/1997 Dadgar et al.
6,037,401 A 3/2000 Tijssen
6,388,153 B2 5/2002 Gridnev
6,414,064 B1 7/2002 Matsuoka et al.
6,872,789 B2 * 3/2005 Brinkhuis et al. ............. 526/89
2002/0061983 A1 * 5/2002 Kolich et al. ............. 525/333.4

FOREIGN PATENT DOCUMENTS

| JP | H8-188622 | 7/1996 |
| JP | 08-188622 | 7/1999 |
| WO | 97/31063 A1 | 8/1997 |
| WO | WO 02/24812 A2 | 3/2002 |
| WO | WO 02/024812 A3 | 3/2002 |

OTHER PUBLICATIONS

Written Opinion of the International Searching Authority for PCT/US2005/035384 received Feb. 1, 2006, 5 pages.
Chemistry Letters (Japan), 1992, pp. 1089-1092.
The Encyclopedia of Polymer Science and Technology, 3rd ed., vol. 6, pp. 563-600.
The Encyclopedia of Chemical Technology, 4th ed., vol. 6, pp. 841-876.

* cited by examiner

*Primary Examiner*—Fred M Teskin
(74) *Attorney, Agent, or Firm*—Jaimes Sher

(57) ABSTRACT

A controlled molecular weight polymer of styrene is provided having bromine substituted thereon. Control of molecular weight is achieved by the use of alpha-methyl styrene dimer as a chain transfer agent. The brominated polymer of styrene is useful as a flame retardant, particularly for polyamides giving improved properties including color retention after molding.

5 Claims, No Drawings

POLYMERS OF BROMOSTYRENES HAVING CONTROLLED MOLECULAR WEIGHT

CLAIMING BENEFIT

This application claims priority from U.S. Provisional Application No. 60/615,132, filed Sep. 30, 2004, entitled "CONTROLLED MOLECULAR WEIGHT BROMOSTYRENES."

FIELD OF THE INVENTION

Novel homopolymers and copolymers of bromostyrene monomers are prepared using α-methyl styrene dimer (MSD) as a chain transfer agent to control molecular weight. The high temperature polyamide (HTPA) products containing these materials provide superior color retention after molding under high temperature conditions compared with materials that were prepared without the MSD chain transfer agent.

BACKGROUND OF THE INVENTION

Bromostyrene polymers are known flame retardants for a variety of plastics, but have especially found use in the polyamide family due to their remarkable thermal stability. Commercially available homopolymers and functionalized copolymers of mixed mono-, di-, and tribromostyrenes, available from Great Lakes Chemical Corporation, are the products of choice for HTPA. The use of bromostyrene homopolymers in HTPA is described in numerous patents and publications, while functionalized bromostyrene-glycidyl (meth)acrylate copolymers in HTPA are disclosed in WO 02/24812 to Martens et al. of Dupont and in U.S. Pat. No. 6,414,064 B1 to Matsuoka and Sasaki of Kuraray.

HTPA incorporating bromostyrene polymers suffer from compromised melt flow. Improved molecular weight control for the bromostyrene polymers can provide increase the melt flow of the flame retarded HTPA composition, thereby improving the processability without compromise of flame retardancy. As taught in U.S. Pat. No. 5,304,618 to Atwell et al. of Great Lakes Chemical Corp., the molecular weight of the polybromostyrenes has typically been adjusted using 1-dodecanethiol as a chain transfer agent added during polymerization. For a period of time a homopolymer of mixed mono-, di- and tribromostyrenes having about 60 wt % bromine and a weight average molecular weight (Mw) of about 8,000 was commercially available from Great Lakes Chemical Corp. It was catalogued as "PDBS-10" and was marketed to the polyester and polyamide area. This low molecular weight/high melt flow polymer was produced by the use of a thiol chain transfer agent.

The use of α-methyl styrene dimer as a molecular weight regulator for free radical stryrenic polymerizations is known. See, for example, U.S. Pat. No. 5,559,200 to Suzuki et al. of Hitachi Chemical. Further, at a point many years after commercial introduction of PDBS-10 described above, JP 08-188622 to Horie and Kagawa of Tosoh Corp. restated that polymers of bromostyrene with an MW of between 1,000 to 10,000 have improved compatibility, flow, thermal discoloration resistance and electrical properties. The application notes that the benefits can be realized by solution polymerizing bromostyrene in the presence of a chain transfer agent to obtain an Mw of less than 10,000. While this publication does disclose that MSD may be used as the chain transfer agent, it does not indicate that any particular advantage is obtained in using MSD over the alkyl mercaptans (thiols) or alkyl halides that are described. Further, it does not teach the desirability in using MSD to produce polymers of bromostyrenes having an Mw of greater than 10,000.

While the known bromostyrene polymers serve as flame retardants for high temperature polymers, a need still exists for a polymeric flame retardant which improves processability high temperature polymers, particularly HTPA. An advantage found from the bromostyrenes disclosed is a reduced discoloration of the composition in the event it is processed at an elevated temperature for an extended period of time.

SUMMARY OF THE INVENTION

It is an object of the invention to provide polymers of ar-bromostyrene monomers having the following general structure:

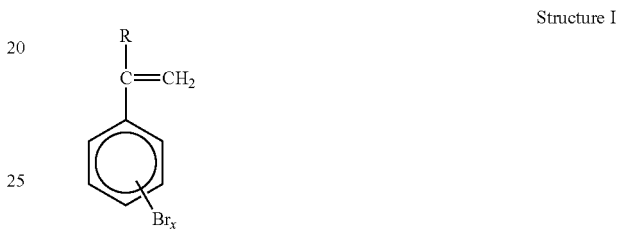

Structure I where R is H or $CH_3$ and x is an integer of 1 to 5. Preferably, on average, X is 2 or more. As X approaches 5, the time for bromination is extended. Average values of X of 2.5 to 3.5 are found useful. The prefix 'ar-' used herein means substituted on an aromatic ring. Further, these polymers have an assigned weight average molecular weight (Mw) compared with a polystyrene standard as measured by gel permeation chromatography of from about 11,000 to about 60,000. Moreover, the polymers may further comprise residues of α-methyl styrene dimer.

It is another object of the invention to provide bromostyrene polymers by polymerization of styrene in the presence of MSD, followed by bromination.

It is another object of the invention to provide an essentially solvent-free process to control the molecular weight of bromostyrene polymers in which α-methyl styrene dimer is used as a chain transfer agent.

It is yet another object to provide improved high temperature flame retardant polyamide compositions comprising bromostyrene polymers which contain residues of α-methyl styrene dimer.

DETAILED DESCRIPTION OF THE INVENTION

Polymers of the present invention comprise units of ar-bromostyrenes or α-methyl bromostyrenes having the structure I where R is H or $CH_3$ and x is an integer of 1 to 5. Preferably the units are ar-bromostyrenes containing 2-4 bromine atoms per molecule, and most preferably the polymers are formed from mixtures of ar-bromostyrenes having an average of about 3 bromine atoms per molecule.

While it is most preferred that the polymers be derived from the polymerization of aromatically brominated monomers, they can also be made by the post-bromination of lower molecular weight polystyrene prepared using α-methyl styrene dimer as a chain transfer agent. The process of bromination of simple polystyrene is well-known in the flame retardant industry.

The polymers of the present invention may contain a lesser number of units other than the ar-bromostyrenes. These may be any other molecule capable of copolymerizing with the ar-bromostyrene and could be advantageously included to modify the compatibility of the flame retardant polymer with a particular base resin requiring reduced flammability. Examples of possible functional co-monomers include, but are not limited to, glycidyl(meth)acrylate, maleic anhydride, hydroxyethylmethacrylate, acrylic acid, ar-amino substituted styrene, and styrene sulfonic acid and its salts.

If the addition of a comonomer is desired to enhance compatibility of bromostyrene with the polymer matrix to be flame retarded, then it is preferred to provide sufficient amount of comonomer to provide the desired improvement in compatibility, but not so much as to significantly dilute the amount of bromine in the composition. The comonomer is believed to provide improved compatibility when comprising at least about 0.110 mol % but no more than 10% mol based on the amount of bromostyrene used, co-monomer amounts at least about 0.5 mol % but no more than about 5 mol % being more preferred.

Besides the inclusion of functional co-monomers, it is also possible to copolymerize the bromostyrene with other monomers in order to modify the character of the final product. Some examples of potential nonfunctional co-monomers include styrene, butadiene, acrylonitrile, methyl(meth)acrylate, divinylbenzene, isoprene, n-butylacrylate, α-methyl styrene, and p-methylstyrene.

The resulting copolymer, depending more so on the selection of bromostyrene used, should preferably contain at least about 50 wt % bromine but no more than about 80 wt % bromine, more preferably at least about 55 wt % but no more than 75 wt % bromine, and most preferably at least about 60 wt % bromine but no more than 70 wt % bromine.

The bromostyrene polymer is preferably of a moderate to low molecular weight in order to impart improved flow properties to the total composition. For the purposes of this disclosure, molecular weight is defined in terms of weight average molecular weight (Mw) compared with a polystyrene standard as measured by gel permeation chromatography (GPC). This means that for a given sample of poly(bromostyrene), or bromopolystyrene, it is assigned the Mw of a known polystyrene standard having the identical GPC retention time. This is believed to indicate that the average chain length of the poly(bromostyrene) and the polystyrene standard are about the same, but that this does not take into account the mass contributed by the bromine atoms, so true molecular weight would require further calculation based on the average number of bromine atoms per ring. The assigned Mw of the bromostyrene polymers of this invention will preferably be at least about 11,000 but no more than about 80,000. More preferably they will range from about 13,000 to about 60,000. Most preferably the bromostyrene polymer will have an assigned MW of from about 15,000 to about 20,000.

The invention makes advantageous use of an α-methyl styrene dimer to control the molecular weight of the bromostyrene polymer during free radical polymerization. Applicant found advantageous properties resulting in the use of the α-methyl styrene dimer that were not available from the prior art mercaptan or aliphatic halide chain transfer agents. The α-methyl styrene resulted in an improved stability during molding. Although not wishing to be bound by any theory, it appears that use of chain-transfer agents containing heteroatoms (sulfur, halogen, oxygen, for example) tend to lessen the thermal stability of the resulting polymer system. Other hydrocarbon materials such as substituted MSD types of products, toluene, and others known to one skilled in the art may be used. MSD is preferred due to its higher efficiency relative to the others.

Commercially available α-methyl styrene dimer may not be a single, pure material. U.S. Pat. No. 6,388,153 B2 to Gridnev of Dupont teaches that there are at least two major isomers that may be present. See structures II and III. According to the U.S. Pat. No. 6,388,153 patent, the isomer in structure III with the "external" double bond is the one which functions best as a molecular weight modifier. Although mixtures of the isomers may provide the objectives of this invention, it is preferred that dimer with the highest possible concentration of structure III isomer be used.

Isomers of alpha-methyl Styrene Dimer

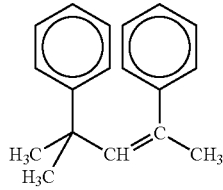

Structure II

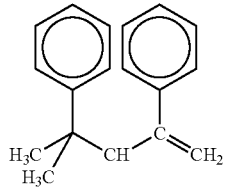

Structure III

The U.S. Pat. No. 6,388,153 patent also teaches that the aromatic rings may be substituted with various reactive functional groups. This may be highly desirable when used as a chain transfer agent in bromostyrene polymerizations. Poly (bromostyrene) homopolymer has poor compatibility with most plastics.

Scanning electron micrographs of molded HTPA show what appears to be discreet spheres or globules of bromostyrene in the matrix of HTPA rather than a homogeneous blend. This separation apparent on electron micrographs of cooled moldings appears in spite of apparent complete dispersion of bromostyrene in the HTPA melt. The addition of reactive or compatibilizing polar groups to the bromostyrene polymer via the introduction of functional comonomers previously described has been taught to reduce the two-phase appearance in micrographs as compared to homopolymer.

As taught by Watanabe et al. (Addition-Fragmentation Chain Transfer in Free Radical Styrene Polymerization in the Presence of 2,4-diphenyl-4-methyl-1-pentene, Chemistry Letters (Japan), 1992, pp. 1089-1092) residues of the α-methyl styrene dimer chain transfer agent do become part of the polymer composition. Therefore, it is believed that when using a selectively derivatized α-methyl styrene dimer, the dimer residues—which may be present at a terminal of many of the bromostyrene chains—could carry a reactive or polar compatibilizing group attached to the ring which will improve the compatibility of the bromostyrene polymer with the matrix polymer requiring flame retardancy. For example, the U.S. Pat. No. 6,388,153 patent says that both rings of the α-methyl styrene dimer may contain one or more —NH$_2$ or —N=C=O groups. Either of these groups can be expected to improve compatibility with polar matrix polymers such as polyesters and polyamides. It can also be expected that if the rings carry other polar groups compatible with polymers having a polar nature, that compatibility will be improved. Examples of such polar substituents which might be bound to the MSD aromatic rings include amines, carboxylic acid and its salts, amides, esters, and epoxides.

The bromostyrene polymers of the present invention may be prepared using free radical methods known in the industry. Polymerizations may be conducted in batch, semi-continuous, or continuous fashion. The reactions may be run in the presence of a solvent, or in an essentially solventless system as described in the U.S. Pat. No. 5,304,618 patent mentioned above. For the purposes of speed and economy, the solventless process is preferred. Any of the common free radical initiators such as peroxy and azo compounds may be used to accelerate the reaction and to reduce residual monomer, but thermal initiation and polymerization is possible. (A review of free radical initiators can be found in The Encyclopedia of Polymer Science and Technology, $3^{rd}$ Edition, Volume 6, pp. 563-600.) For the sake of economy and efficiency, the reaction is preferably run in a continuous fashion, without the use of solvent, and in the presence of a free radical initiator; such a method is taught in U.S. Pat. No. 5,304,618, incorporated herein by reference.

The bromostyrene polymers with controlled molecular weight are useful as flame retardants for any thermoplastic polymer, but are especially suited for use in polyester or polyamide resins. The most preferred polyesters are polyethylene terephthalate and polybutylene terephthalate. Any polyamide may be used as a matrix resin, including polyamide-6 and polyamide-66, but those polyamides having melt temperatures above about 280° C. will especially benefit from the stability of the new bromostyrene polymers. Such high temperature polyamides are described in U.S. Pat. No. 5,115,010 to Sakai et al. of Mitsui Petrochemical Industries. Examples of such polymer compositions include polyamide-4,6, polyamide-4,8, polyamide-4,9, polyamide-4,10, polyamide-4,11 polyamide-4,12, polyamide-4,13, polyamide-4,14 and the semi-aromatic polyamides such as polyamide-6,6/6,T, polyamide-4,6/4,T/4,1, polyamide-9,T, polyamide-12,T.

Other additives may be present in the final polymer composition. These may include fillers, reinforcing agents such as glass fiber, colorants, stabilizers such as hydrotalcite, flow enhancers and flame retardant aids such as antimony compounds and zinc borate.

EXAMPLES

Example 1

Compatibilized Copolymer Using Thiol

To simplify preparation of relatively small amounts of polymer, a laboratory scale process based on a solution polymerization method was used. A 2-liter 4 neck flask was equipped with mechanical stirring, heating mantle, thermocouple probe, and a condenser. The flask was then charged with mixed brominated styrene monomer containing about 64% bromine (995.2 g), dichlorobenzene (487.3 g), glycidyl methacrylate (5.08 g, 0.0357 mol), dodecanethiol (7.85 g, 0.0387 mol) as a chain transfer agent (CTA) and 2,2'-azobis (2,4-dimethylvaleronitrile) sold under the tradename VAZO-52™ azo type initiator (1.00 g, 4.03 mmol) available from DuPont. The solution was then heated to about 90° C. until it exothermed. Peak temperature reached was 146° C. after which the mixture was heated to 190° C. over 5-10 min and held at 190° C. for 40-45 min. Heating was halted; the solution (1484.4 g) was transferred to a 2-liter bottle, and cooled to room temperature. The material was split into four parts. Each part was precipitated into a 5-liter flask of 3,400 mL acetone and 400 mL methanol. The precipitate was filtered over frit, dried at ambient temperature for about 14 h and oven dried at 110° C. for 8 h. A white powder (842 g) was isolated.

Example 2

Compatibilized Copolymer Using α-Methyl Styrene Dimer (MSD)

Using the same procedure and equipment as in Example 1, the flask was charged with brominated styrene monomer (1004.2), dichlorobenzene (492 g), glycidyl methacrylate (5.11 g, 0.0359 mol), 2,4-diphenyl-4-methyl-1-pentene (20.13 g, 0.0851 mol) (α-methyl styrene dimer) and VAZO-52™ (1.03 g, 4.15 mmol). The solution was heated to about. 90° C. until exotherm. It then reached a peak temperature of 141° C. after which the mixture was heated to 190° C. over 5-10 min and held at 190° C. for 40-45 min. Heating was halted; the solution (1509.3 g) was transferred to a 2-liter bottle, and cooled to room temperature. The material was split into four parts. Each part was precipitated into a 5-liter flask of 3400 mL acetone and 400 mL methanol. The precipitate was filtered over frit, dried at ambient temperature for about 14 h and oven dried at 110° C. for 8 h. A white powder (881 g) was isolated.

Example 3

Compatibilized Copolymer Using α-Methyl Styrene Dimer (MSD) and Initiator Blend

A high temperature initiator, cumene hydroperoxide, was included in this run to drive the polymerization further towards completion and to reduce residual monomer. The flask was charged with brominated styrene monomer (1002.6), dichlorobenzene (497 g), glycidyl methacrylate (5.13 g, 0.0360 mol), 2,4-diphenyl-4-methyl-1-pentene (20.26 g, 0.08571 mol), VAZO-52™ azo type initiator (1.05 g, 4.22 mmol) and cumene hydroperoxide (1.06 g, 6.96 mmol). The solution was then heated to about 90° C. until exotherm. Peak temperature reached was 163° C. after which the mixture was heated to 190° C. over 5-10 min and held at 190° C. for 40-45 min. Heating was halted; the solution (1513.7 g) was transferred to a 2-liter bottle, and cooled to room temperature. The material was split into four parts. Each part was precipitated into a 5-liter flask of 3400 mL acetone and 400 mL methanol. The precipitate was filtered over frit, dried at ambient temperature for about 14 h and oven dried at 110° C. for 8 h. A white powder (883 g) was isolated.

Example 4

Styrene (1012.3 g), chlorobenzene (1483.9 g), 1-dodecanethiol (12.0 g), and Vazo® 52 (1.092 g) were charged to a 3 liter 4 neck flask equipped with a mechanical stirrer, THERM-O-WATCH®), thermocouple, heating mantle and condenser. The mixture was stirred for 14 minutes at room temperature and then heat was applied. The temperature was raised to 80° initially during which time the polymerization initiated and exothermed to 85° C. The temperature was then raised to 130° C. and held for 10 hours. Heat was removed and stirring continued until the temperature was at 90° C.

The reaction mixture was precipitated into methanol (1 mL of reaction mixture per 12 mL of methanol). The product was filtered, dried at 75° C. for 24 hours, cooled and bottled. The yield was 497.4 g of polystyrene.

Under a slow nitrogen purge, polystyrene (477 g) and ethylene chloride (2 L) were charged to a dry 5 liter 4 neck flask equipped with a mechanical stirrer, thermocouple, and condenser. The reaction flask was vented to a scrubber charged with 10% sodium sulfite. The polystyrene slurry was stirred at ambient temperature until a homogeneous solution was obtained. The reaction mixture was then chilled in an ice-bath. Aluminum chloride (9.2 g) was charged to the reaction mixture in one portion. Bromine (717.8 g) was slowly added over 3 h by pump, while maintaining a reaction temperature of 15-20° C. The resulting mixture was stirred overnight at ambient temperature. The following day the mixture was quenched with 1 L water and 50 mL of 50% sodium hydroxide. Temperature was controlled by use of an ice-bath. The product was isolated from the organic phase by azeotropic distillation of ethylene chloride from boiling water (7 L). The product was filtered, washed with water, and dried.

Example 5

A repeat of Example 4.

Example 6

Styrene (1000.0 g), chlorobenzene (1581.4 g), α-methylstyrene dimer (20.0 g), and Vazo® 52 (1.04 g) were charged to a 3 liter 4 neck flask equipped with a mechanical stirrer, thermocouple, heating mantle and condenser. The mixture was stirred for 5 minutes at room temperature and then heat was applied. The temperature was raised to 80° initially during which time the polymerization initiated and exothermed to 85° C. The temperature was then raised to 115° C. and held for 23 hours. Heat was removed and stirring continued until the temperature was at 60° C.

The reaction mixture was precipitated into methanol (1 mL of reaction mixture per 14 mL of methanol). The product was filtered, dried at 75° C. for 24 hours, cooled and bottled. The yield was 596.3 g of polystyrene.

The polystyrene was brominated as in Example 4.

Properties of the polymers prepared are found in Table 1.

TABLE 1

Properties of Bromostyrene Polymers

| | CTA Used | Mols. CTA | Assigned MW | Bromine, % | Residual Monomer, % |
|---|---|---|---|---|---|
| Example 1 | Thiol | 0.0387 | 13,400 | 63.2 | 0.58 |
| Example 2 | MSD | 0.0857 | 16,400 | 63.1 | 0.52 |
| Example 3 | MSD | 0.0857 | 14,900 | 63.4 | 0.21 |
| Example 4 | Thiol | 0.0592 | 58400 | 39.6 | N/A |
| Example 5 | Thiol | 0.0592 | 88000 | 43.3 | N/A |
| Example 6 | MSD | 0.0846 | 83700 | 43.5 | N/A |

These results show that a higher loading of MSD than thiol is required to obtain equivalent molecular weight, but not so much more as to significantly reduce the overall bromine content of the polymer. Also, the use of an initiator blend seems to have the desired effect of reducing the amount of unreacted monomer in the final product.

Examples 7 & 8

Thermal Stability of the Bromostyrene Copolymers

Small samples of copolymer weighing about 10 mg from Example 1 (Example 7) and Example 2 (Example 8) were subjected to isothermal high temperature exposure in a TGA Q 500 Thermogravimetric Analyzer from TA Instruments for 30 minutes at 330° C. under nitrogen while their weight was continually recorded. The stability was determined by measuring the mass loss during the first 20 minutes and calculating the % mass loss per minute (Table 2).

TABLE 2

% Mass Loss Rate During 330° C. Isothermal TGA Exposure

| Sample | % mass loss/ minute | % Mass Retained, 20 minutes | % Mass Retained, 30 minutes |
|---|---|---|---|
| Example 1. | 0.70 | 84.3 | 81.2 |
| Example 2. | 0.49 | 88.4 | 85.9 |

These results show a clear improvement in stability as measured by isothermal TGA analysis (decrease in rate of mass loss) for the MSD-modified copolymer. In one embodiment, the polymers retain at least 88% of their mass after 20 minutes and at least 85% of their mass after 30 minutes when a 10 mg polymer specimen is held at 330° C. under a nitrogen atmosphere.

Examples 9 & 10

Thermal Stability of Polyamide Compositions

Bromostyrene copolymers prepared using as chain transfer agent 1-dodecanethiol and separately MSD were compounded into a glass reinforced high temperature semi-aromatic polyamide (Examples 9 & 10, respectfully). The compounded resin compositions were then injection molded into plaques using two conditions: The first was at a normal melt temperature of about 310° C., while the second was run at about 340° C. to simulate more abusive conditions which might be seen at a typical molding operation optimized to push the limits of processing temperatures in order to reduce melt viscosity and increase productivity. Increase time and temperature exposure may occur if a molding operation is temporarily halted, during which time the next shot of compound is being held in a molten state at a relatively high temperature.

Table 3 shows the normal molding conditions versus the abusive conditions used to evaluate the thermal stability of the formulations described hereafter.

TABLE 3

Normal versus Abusive Molding Conditions

| | Normal | Abusive |
|---|---|---|
| Rear Temperature, ° C. | 304 | 321 |
| Center Temperature, ° C. | 304 | 321 |
| Front Temperature, ° C. | 310 | 325 |
| Nozzle Temperature, ° C. | 321 | 338 |
| Mold Temperature, ° C. | 88 | 88 |

Examples 11, 12, 13 & 14

Compatibilized Copolymers Using MSD with 60 and 64% Bromine Content Monomer

Using the procedures described in Ex. 1 and Ex. 2, two bromostyrene/glycidyl methacrylate copolymers were prepared (Table 4) (Examples 11 & 12, respectfully). Bromostyrene having a lower content of the tribrominated species was used. Additionally, to investigate the effects of conducting the polymerization reaction without solvent and under higher temperature conditions (as described in U.S. Pat. No. 5,304,618), some additional copolymers were prepared using 0.5% GMA as shown in Table 4 (Examples 13 & 14, respectfully).

TABLE 4

Additional Bromostyrene/GMA Copolymers

| Chain Transfer | Ex. 11 | Ex. 12 | Ex. 13 | Ex. 14 |
|---|---|---|---|---|
| | Solvent Process | | Neat Process | |
| Agent | 1-dodecanethiol | MSD | 1-dodecanethiol | MSD |
| Assigned MW | 18,400 | 22,800 | 17,100 | 19,700 |
| Bromine Content, % | 59.0 | 59.1 | 64.8 | 64.0 |

Polyamide formulations of Tables 5 and 5a were processed through a Berstorff ZE 25 twin screw extruder. The glass fiber was side-fed into the fifth barrel of the extruder using a Brabender loss in weight feeder and a K-tron side feeder to reduce fiber breakage. Barrel temperatures were ramped from 310° C. at the feed throat to 330° C. at the die. The nominal feed rate was about 35 lbs/hr. The extruded strand was cooled in a water bath and chopped into pellets.

TABLE 5

Polyamide Formulations Made From Polymerized Bromostyrenes

| | Example No.: | | | | | |
|---|---|---|---|---|---|---|
| | 15 | 16 | 17 | 18 | 19 | 20 |
| Polyamide[1], % | 45 | 45 | 41 | 41 | 45 | 45 |
| Glass Fiber[2], % | 30 | 30 | 30 | 30 | 30 | 30 |
| Ex. 1, % | 20.3 | — | — | — | — | — |
| Ex. 2, % | — | 20.3 | — | — | — | — |
| Ex. 11, % | — | — | 22 | — | — | — |
| Ex. 12, % | — | — | — | 22 | — | — |
| Ex. 13, % | — | — | — | — | 20.3 | — |
| Ex. 14, % | — | — | — | — | — | 20.3 |
| Antimony Trioxide[3], % | 4.5 | 4.5 | 7 | 7 | 4.5 | 4.5 |
| Magnesium Stearate[4], % | 0.35 | 0.35 | 0.35 | 0.35 | 0.35 | 0.35 |

[1]Zytel ® HTN from Dupont
[2]Chopped Strand #3540 from PPG Industries
[3]TMS-HP ® from Great Lakes Chemical Corp.
[4]Lubricant from Synpro

TABLE 5a

Polyamide compositions made from bromination of polystyrene

| | Example No.: | | |
|---|---|---|---|
| | 21 | 22 | 23 |
| Polyamide[1], % | 39.75 | 39.75 | 39.75 |
| Glass Fiber[2], % | 30 | 30 | 30 |
| Ex. 4, % | 22.5 | — | — |
| Ex. 5, % | — | 22.5 | — |
| Ex. 6, % | — | — | 22.5 |
| Zinc Borate[3], % | 7 | 7 | 7 |
| PTFE[4], % | 0.4 | 0.4 | 0.4 |
| Polyethylene wax[5], % | 0.35 | 0.35 | 0.35 |

[1]Zytel ® HTN from DuPont
[2]Chopped Strand #3540 from PPG Industries
[3]FireBrake ® from US Borax
[4]Teflon ® 6C from DuPont
[5]Luwax ® OP from BASF Using a Van Dorn 35 ton injection molding machine, the pellets were molded into plaques measuring approximately 2×3 inches. The normal and abusive procedures described in Table 3 were used.

To quantify the degree of color change in going from normal processing temperature to the higher processing temperature, readings were taken on both sets of plaques using a Colorquest Tristimulus calorimeter. L, a, and b values were measured. (For a detailed discussion of color measurement see The Encyclopedia of Chemical Technology, 4$^{th}$ Edition, Volume 6, pp. 841-876.) A calculation was applied to the L, a, and b values in going from low to high temperature processing to obtain a color difference reading, ΔE where $$\Delta E = [(\Delta L)^2 + (\Delta a)^2 + (\Delta b)^2]^{1/2}$$

The results are shown in Table 6.

TABLE 6

Color Comparison of Formulations

| Compounded Material Example Number | Polymer, % Br | Polymer Process | Color Difference (Abusive – Normal Molding), ΔE |
|---|---|---|---|
| 15 | 63.2 | solvent, thiol | 10.30 |
| 16 | 63.1 | solvent, MSD | 2.10 |
| 17 | 59.0 | solvent, thiol | 6.91 |
| 18 | 59.1 | solvent, MSD | 1.89 |
| 19 | 64.8 | neat, thiol | 7.00 |
| 20 | 64.0 | neat, MSD | 0.50 |
| 21 | 39.6 | solvent, thiol | 3.59 |
| 22 | 43.3 | solvent, thiol | 2.73 |
| 23 | 43.5 | solvent, MSD | 1.65 |

The polyamide compositions that contain the thiol-modified bromostyrene copolymers are a pale yellow/gray color at moderate molding temperatures, but when processed hotter yields a markedly gray color. The MSD-modified bromostyrene system is pale yellow at the lower temperature and the color is maintained at the higher processing temperature. The color differences for the plaques that contain a ΔE value of near 2 or below are difficult to detect with the naked eye.

For polyamide formulations containing the thiol-modified copolymers, the ΔE values are quite high at the 6.9-10.3 range, whereas the polymide formulations containing the MSD-modified copolymers, the ΔE is in the 0.5-2.1 range, confirming that there was much less overall color change when the copolymers of this invention were used.

What is claimed:

1. Polymers of ar-bromostyrene monomers having the following general structure

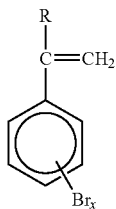

where R is H and x is 3, where the polymers have an assigned weight average molecular weight (MW) compared with a polystyrene standard as measured by gel permeation chromatography of from about 11,000 to about 60,000, wherein the polymers further comprise residues of α-methyl styrene dimer.

2. The polymers of claim 1 further comprising units derived from copolymerization with a comonomer selected from the group consisting of glycidyl(meth)acrylate, maleic anhydride, hydroxyethylmethacrylate, acrylic acid, ar-amino substituted styrene, styrene sulfonic acid, salts of styrene sulfonic acid and mixtures thereof.

3. The polymers of claim 1 further comprising units derived from copolymerization with a comonomer selected from the group consisting of styrene, butadiene acrylonitrile, methyl-(meth)acrylate, divinyl benzene, isoprene, n-butylacrylate, α-methyl styrene, p-methyl styrene and mixtures thereof.

4. The polymers of claim 1 in which the α-methyl styrene dimer residue bears at least one aromatically bound polar compatibilizing group chosen from the group of —NH$_2$, —N═C═O, amines, carboxylic acids, salts of carboxylic acids, amides, esters and epoxides.

5. Polymers of ar-bromostyrene monomers having the following general structure

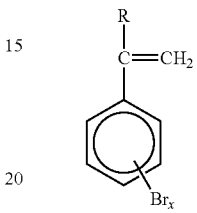

where R is H and x is 3, where the polymers have an assigned weight average molecular weight of from about 11,000 to about 60,000, wherein the polymers retain at least 88% of their mass after 20 minutes and at least 85% of their mass after 30 minutes when a 10 mg specimen is held at 330° C. under a nitrogen atmosphere.

* * * * *